(12) United States Patent
Kang

(10) Patent No.: US 11,813,933 B2
(45) Date of Patent: Nov. 14, 2023

(54) VEHICLE FLOOR STRUCTURE

(71) Applicants: HYUNDAI MOTOR COMPANY, Seoul (KR); KIA MOTORS CORPORATION, Seoul (KR)

(72) Inventor: Seung Min Kang, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 375 days.

(21) Appl. No.: 17/026,611

(22) Filed: Sep. 21, 2020

(65) Prior Publication Data

US 2021/0178883 A1    Jun. 17, 2021

(30) Foreign Application Priority Data

Dec. 16, 2019  (KR) .......... 10-2019-0167620

(51) Int. Cl.
| | |
|---|---|
| *B60K 1/04* | (2019.01) |
| *B62D 25/20* | (2006.01) |
| *B60N 2/015* | (2006.01) |
| *B62D 25/02* | (2006.01) |
| *B62D 27/02* | (2006.01) |

(52) U.S. Cl.
CPC .......... *B60K 1/04* (2013.01); *B60N 2/015* (2013.01); *B62D 25/025* (2013.01); *B62D 25/2036* (2013.01); *B62D 27/02* (2013.01); *B60K 2001/0438* (2013.01)

(58) Field of Classification Search
CPC ........... B60K 1/04; B60K 2001/0438; B60K 2001/0422; B60N 2/015; B62D 25/025; B62D 25/2036; B62D 27/02; B62D 21/157; B62D 25/20; B62D 25/2009; B62D 21/02; B62D 21/08; B60Y 2306/01
See application file for complete search history.

(56) References Cited

U.S. PATENT DOCUMENTS

| | | | | |
|---|---|---|---|---|
| 2,113,403 | A  * | 4/1938 | Harmon .......... | B62D 21/02 |
| | | | | 219/137 R |
| 7,828,370 | B2 * | 11/2010 | Ohi .......... | B62D 25/20 |
| | | | | 296/193.07 |
| 7,963,588 | B2 * | 6/2011 | Kanagai .......... | B62D 25/025 |
| | | | | 296/203.03 |
| 9,944,162 | B2 * | 4/2018 | Li .......... | B62D 25/025 |

(Continued)

FOREIGN PATENT DOCUMENTS

| | | | |
|---|---|---|---|
| FR | 3117947 A1 | * 6/2022 | |
| JP | 2017196958 A | * 11/2017 | |
| WO | WO-0061424 A1 | * 10/2000 | .......... B62D 21/09 |

*Primary Examiner* — James A Shriver, II
*Assistant Examiner* — Michael T. Walsh
(74) *Attorney, Agent, or Firm* — LEMPIA SUMMERFIELD KATZ LLC

(57) ABSTRACT

A vehicle floor structure includes: a center floor panel; a pair of side sills mounted on both sides of the center floor panel; a plurality of structural members attached to a bottom surface of the center floor panel; and a plurality of seat crossmembers attached to the bottom surface of the center floor panel, wherein each structural member extends in a longitudinal direction of the center floor panel, each seat crossmember extends in a width direction of the center floor panel, and an axis of the structural member is orthogonal to an axis of the seat crossmember.

8 Claims, 7 Drawing Sheets

(56) References Cited

U.S. PATENT DOCUMENTS

| | | | |
|---|---|---|---|
| 10,532,708 B2* | 1/2020 | Yamashita | H02G 3/0487 |
| 10,532,777 B2* | 1/2020 | Lee | B62D 25/2027 |
| 10,647,213 B2* | 5/2020 | Otoguro | B60K 1/04 |
| 11,235,811 B2* | 2/2022 | Lee | B60K 1/04 |
| 11,351,890 B2* | 6/2022 | Park | B60N 2/005 |
| 11,420,509 B2* | 8/2022 | Saeki | B62D 25/20 |
| 2023/0108511 A1* | 4/2023 | Higuchi | B62D 27/02 |
| | | | 296/203.03 |
| 2023/0145164 A1* | 5/2023 | Kang | B62D 25/025 |
| | | | 180/68.5 |

* cited by examiner

VEHICLE FLOOR STRUCTURE

CROSS-REFERENCE TO RELATED APPLICATION

This application claims priority to and the benefit of Korean Patent Application No. 10-2019-0167620, filed on Dec. 16, 2019, the entire contents of which are incorporated herein by reference.

FIELD

The present disclosure relates to a vehicle floor structure, and more particularly, to a vehicle floor structure capable of uniformly distributing a load and improving mount stiffness of a battery assembly and mount stiffness of a vehicle seat.

BACKGROUND

The statements in this section merely provide background information related to the present disclosure and may not constitute prior art.

Lately, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An electric vehicle is equipped with a battery assembly which is mounted to a vehicle body. The battery assembly includes one or more battery cells (or a battery module), electric/electronic components associated with the battery cells, and a battery case in which the battery cells and the electric/electronic components are mounted. The battery case is made up of an upper case and a lower case. The battery assembly may be mounted under a floor panel of the vehicle body.

In line with the development of autonomous vehicles as well as electric vehicles, research and development are being conducted to apply a flat floor and hidden seat rails, etc., in order to secure a larger passenger compartment and improve the interior design. However, we have discovered that the application of the flat floor and the hidden sheet rails may reduce the cross section of a body structural member, such as a seat crossmember, which may affect stiffness and crashworthiness.

According to the related art, as the battery assembly is indirectly connected to the floor of the vehicle body through brackets and the like, the mount stiffness of the battery assembly may be reduced.

The above information described in this background section is provided to assist in understanding the background of the inventive concept, and may include any technical concept which is not considered as the prior art that is already known to those skilled in the art.

SUMMARY

The present disclosure provides a vehicle floor structure capable of uniformly distributing a load on a floor and improving mount stiffness of a battery assembly and mount stiffness of a vehicle seat.

According to an aspect of the present disclosure, a vehicle floor structure may include: a center floor panel; a pair of side sills mounted on both sides of the center floor panel; a plurality of structural members attached to a bottom surface of the center floor panel; and a plurality of seat crossmembers attached to the bottom surface of the center floor panel, wherein each structural member may extend in a longitudinal direction of the center floor panel, each seat crossmember may extend in a width direction of the center floor panel, and an axis of the structural member may be orthogonal to an axis of the seat crossmember.

Each end of at least one seat crossmember among the plurality of seat crossmembers may be connected to a corresponding side sill through a reinforcing member.

The reinforcing member may have a first flange and a second flange, the first flange may be joined to the side sill, and the second flange may be joined to the center floor panel.

The reinforcing member may have an inclined wall extending obliquely from the center floor panel toward the side sill, and the seat crossmember may have a flange joined to the inclined wall of the reinforcing member.

The plurality of seat crossmembers may include: a first seat crossmember adjacent to a front edge of the center floor panel; a second seat crossmember spaced apart from the first seat crossmember toward a rear of the center floor panel; a third seat crossmember spaced apart from the second seat crossmember toward the rear of the center floor panel; and a fourth seat crossmember spaced apart from the third seat crossmember toward the rear of the center floor panel.

The plurality of structural members may include: a pair of first structural members located on a front of the center floor panel; and a pair of second structural members located on the rear of the center floor panel.

A front end of each side sill may be connected to a front side member, and each first structural member may have a front extension portion joined to the front side member.

Each second structural member may connect the third seat crossmember and the fourth seat crossmember.

The vehicle floor structure may further include a plurality of seat rails attached to a top surface of the center floor panel, and at least some of the plurality of structural members may be disposed to face at least some of the plurality of seat rails.

A battery assembly may be mounted under the center floor panel, and a mounting bolt penetrating the battery assembly and the center floor panel may engage with the seat rail.

A side sill reinforcement may be mounted in a cavity of each side sill, each end of at least one seat crossmember among the plurality of seat crossmembers may be connected to a corresponding side sill reinforcement through a reinforcing member, and the side sill may have an opening through which the reinforcing member passes.

The reinforcing member may have a first flange and a second flange, the first flange may be joined to the side sill reinforcement, and the second flange may be joined to the center floor panel.

The reinforcing member may have an inclined wall extending obliquely from the center floor panel toward the side sill reinforcement, and the seat crossmember may have a flange joined to the inclined wall of the reinforcing member.

The plurality of structural members may include a pair of structural members extending through the plurality of seat crossmembers along an entire length of the center floor panel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
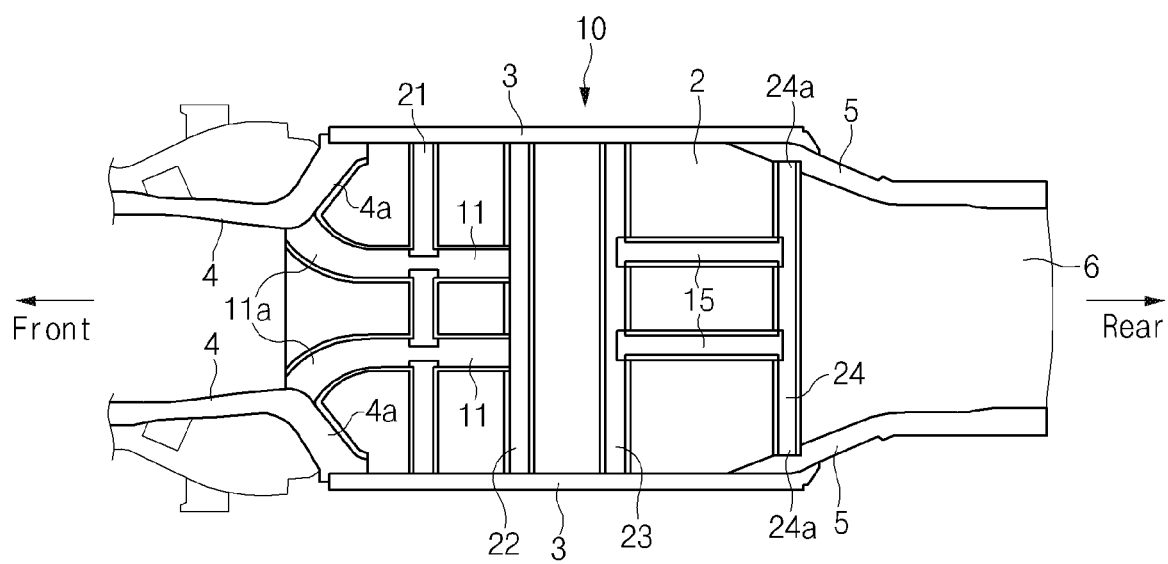
FIG. 1 illustrates a bottom view of a vehicle floor structure according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These teams are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
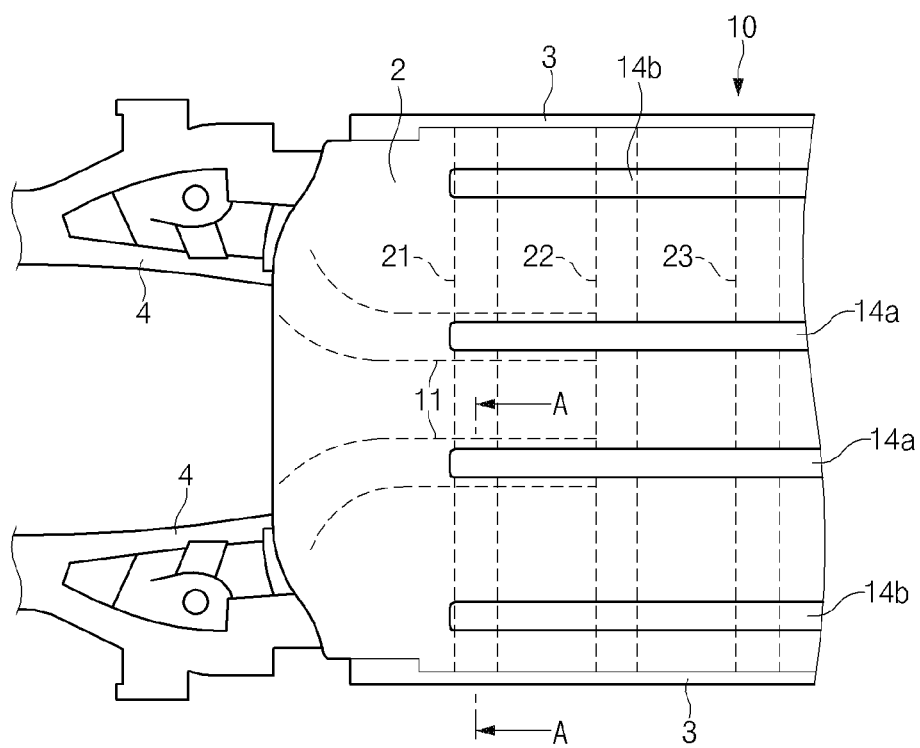
FIG. 2 illustrates a plan view of a vehicle floor structure according to an exemplary form of the present disclosure.

Referring to FIGS. 1 and 2, a vehicle floor structure 10 according to an exemplary form of the present disclosure may include: a center floor panel 2 disposed on the bottom of a vehicle body, a rear floor panel 6 connected to a rear edge of the center floor panel 2, and a pair of side sills 3 mounted on both side edges of the center floor panel 2.

The center floor panel 2 and the rear floor panel 6 may be disposed on the bottom of the vehicle body to form a floor of the vehicle body.

Each side sill 3 may extend in a longitudinal direction of the vehicle. The side sills 3 may be mounted on the side edges of the center floor panel 2, respectively, and thus the pair of side sills 3 may be spaced apart from each other in a width direction of the center floor panel 2.

A pair of front side members 4 may be disposed on the front of the vehicle body. Each front side member 4 may have an extension 4a extending toward the corresponding side sill 3. A pair of rear side members 5 may be disposed on the rear of the vehicle body. A front end of each side sill 3 may be connected to the extension 4a of the corresponding front side member 4, and a rear end of each side sill 3 may be connected to the corresponding rear side member 5. The pair of rear side members 5 may be mounted on both side edges of the rear floor panel 6, respectively.

In one form of the present disclosure, the vehicle floor structure 10 may include a plurality of structural members 11 and 15 attached to a bottom surface of the center floor panel 2. The structural members 11 and 15 may extend in a longitudinal direction of the center floor panel 2.

Referring to FIGS. 1 and 2, the plurality of structural members 11 and 15 may include a pair of first structural members 11 located on the front of the center floor panel 2, and a pair of second structural members 15 located on the rear of the center floor panel 2.

The pair of first structural members 11 may be spaced apart from each other in the width direction of the center floor panel 2. Each first structural member 11 may have a front extension portion 11a extending toward the front side member 4, and the front extension portion 11a may be bent at a predetermined angle. An end of the front extension portion 11a may be directly joined to the front side member 4 by welding and/or the like.

The first structural members 11 may be directly connected to the corresponding front side members 4, and thus the pair of first structural members 11 may stably support a vertical load acting on the front of the center floor panel 2. In addition, as the first structural members 11 are directly connected to the front side members 4, a load path may be defined separately from the side sills 3, and thus the load transferred to the center floor panel 2 through the front side members 4 may be distributed to the side sills 3 and the first structural members 11.

The pair of second structural members 15 may be spaced apart from each other in the width direction of the center floor panel 2. The second structural members 15 may be spaced apart from the corresponding first structural members 11 toward the rear of the vehicle body.

Referring to FIGS. 1 and 2, the vehicle floor structure 10 may include a plurality of seat crossmembers 21, 22, 23, and 24 attached to the bottom surface of the center floor panel 2. Each of the seat crossmembers 21, 22, 23, and 24 may extend in the width direction of the center floor panel 2, and vehicle seats may be mounted on the seat crossmembers 21, 22, 23, and 24 through brackets and/or the like.

According to an exemplary form, the plurality of seat crossmembers 21, 22, 23, and 24 may include a first seat crossmember 21 adjacent to a front edge of the center floor panel 2, a second seat crossmember 22 spaced apart from the first seat crossmember 21 toward the rear of the center floor panel 2, a third seat crossmember 23 spaced apart from the second seat crossmember 22 toward the rear of the center floor panel 2, and a fourth seat crossmember 24 adjacent to the rear edge of the center floor panel 2. For example, a front mount of a front vehicle seat may be mounted on the first seat crossmember 21, and a rear mount of the front vehicle seat may be mounted on the second seat crossmember 22. A front mount of a rear vehicle seat may be mounted on the third seat crossmember 23, and a rear mount of the rear vehicle seat may be mounted on the fourth seat crossmember 24.

Each first structural member 11 may extend through the first seat crossmember 21 toward the rear of the center floor panel 2. In particular, a rear end of each first structural member 11 may be directly joined to the second seat crossmember 22 by welding and/or the like. Each second structural member 15 may connect the third seat crossmember 23 and the fourth seat crossmember 24. In one form, a front end of each second structural member 15 may be joined to the third seat crossmember 23 by welding and/or the like, and a rear end of each second structural member 15 may be joined to the fourth seat crossmember 24 by welding and/or the like.

As the plurality of structural members 11 and 15 and the plurality of seat crossmembers 21, 22, 23, and 24 are attached to the bottom surface of the center floor panel 2, the stiffness of the center floor panel 2 may be improved. In addition, a top surface of the center floor panel 2 may be effectively flattened, and the thickness of a carpet may be unified, and thus cost and weight may be reduced.

Each end of at least some seat crossmembers 21, 22, and 23 among the plurality of seat crossmembers 21, 22, 23, and 24 may be connected to the corresponding side sill 3 through a reinforcing member 20.

Figure 3:
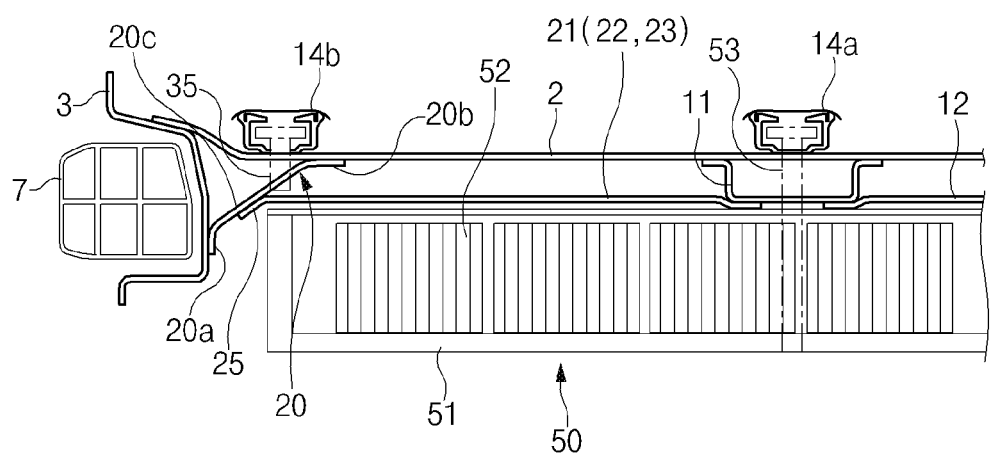
FIG. 3 illustrates a cross-sectional view taken along line A-A of FIG. 2.
Figure 4:
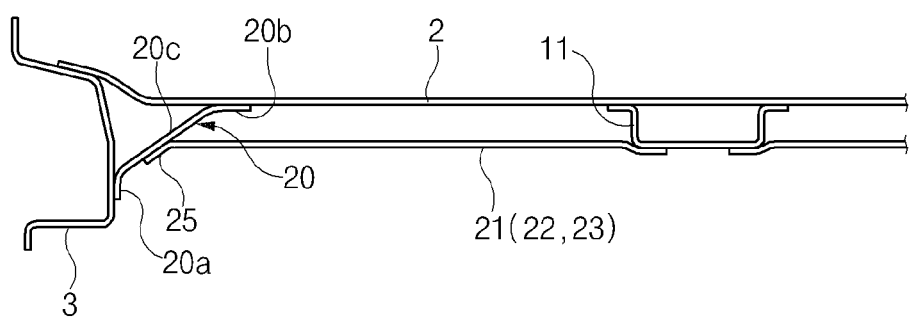
FIG. 4 illustrates a cross-sectional view of the structure in FIG. 3 from which a battery assembly, a side sill reinforcement, and seat rails are removed.

Referring to FIGS. 3 and 4, the reinforcing member 20 may have an inclined wall 20c extending obliquely from the center floor panel 2 toward the side sill 3 at a predetermined angle. Each of the first seat crossmember 21, the second seat crossmember 22, and the third seat crossmember 23 may have a flange 25 extending from the end thereof. The flange 25 may have an inclined angle corresponding to that of the inclined wall 20c, and the flange 25 may be joined to the inclined wall 20c of the reinforcing member 20 by welding and/or the like. Each flange 25 of the first seat crossmember 21, each flange 25 of the second seat crossmember 22, and each flange 25 of the third seat crossmember 23 may be joined to the inclined wall 20c of the reinforcing member 20 by welding and/or the like so that each of the seat crossmembers 21, 22, and 23 may be connected to the side sill 3 through the reinforcing member 20. As the ends of each of the seat crossmembers 21, 22, and 23 are connected to the corresponding side sills 3 through the reinforcing members 20, the support stiffness of the side sills 3 may be improved. For example, when an impact load in a side impact is transferred to the side sill 3, the side sill 3 may be primarily supported by the reinforcing member 20 and be secondarily supported by the seat crossmembers 21, 22, and 23, and thus rotation or damage of the side sill 3 may be prevented.

Referring to FIG. 1, each end 24a of the fourth seat crossmember 24 may be directly joined to the corresponding rear side member 5 by welding and/or the like.

Referring to FIGS. 3 and 4, the reinforcing member 20 may have a first flange 20a and a second flange 20b extending along edges of the reinforcing member 20, respectively. The first flange 20a of the reinforcing member 20 may be directly joined to the side sill 3 by welding and/or the like, and the second flange 20b of the reinforcing member 20 may be directly joined to the center floor panel 2 by welding and/or the like.

An axis of each of the structural members 11 and 15 may be orthogonal to an axis of each of the seat crossmembers 21, 22, 23, and 24, and the plurality of structural members 11 and 15 may be connected to the plurality of seat crossmembers 21, 22, 23, and 24. The plurality of structural members 11 and 15 and the plurality of seat crossmembers 21, 22, 23, and 24 may be attached to the bottom surface of the center floor panel 2 to form a basic frame of the center floor panel 2, thereby increasing the stiffness and strength of the center floor panel 2.

Referring to FIG. 2, a plurality of seat rails 14a and 14b may be attached to the top surface of the center floor panel 2. Each of the seat rails 14a and 14b may extend in the longitudinal direction of the vehicle body to guide a movement of the vehicle seat. The plurality of seat rails 14a and 14b may include a pair of inner seat rails 14a adjacent to the center of the center floor panel 2, and a pair of outer seat rails 14b adjacent to the respective side sills 3.

At least some of the plurality of structural members 11 and 15 may be disposed to face at least some of the plurality of seat rails 14a and 14b.

Referring to FIG. 2, each first structural member 11 and the corresponding inner seat rail 14a may be located on the same line of the center floor panel 2 so as to face each other. Specifically, the axis of the first structural member 11 may be aligned with an axis of the inner seat rail 14a, and thus the first structural member 11 may be aligned in the same position as the inner seat rail 14a on the center floor panel 2.

In addition, each second structural member 15 and the corresponding inner seat rail 14a may be located on the same line of the center floor panel 2 so as to face each other. In another form, the axis of the second structural member 15 may be aligned with the axis of the inner seat rail 14a, and thus the second structural member 15 may be aligned in the same position as the inner seat rail 14a on the center floor panel 2.

Referring to FIG. 3, a battery assembly 50 may be mounted under the center floor panel 2. The battery assembly 50 may include a plurality of battery modules 52 and a battery case 51 in which the plurality of battery modules 52 are received. A side sill reinforcement 7 may be mounted in a cavity of each side sill 3, and the side sill reinforcement 7 may be an extruded product formed by an extruding method. The side sill reinforcement 7 may have a plurality of ribs so that it may be deformable by an impact load during a side impact of the vehicle. The battery case 51 may be mounted to the center floor panel 2 and the side sills through a plurality of fasteners.

Referring to FIG. 3, a mounting bolt 53 penetrating the top of the battery case 51, the first structural member 11, and the center floor panel 2 may engage with the inner seat rail 14a, and the battery assembly 50 and the inner seat rail 14a may be joined by the mounting bolt 53, and thus the stiffness of the vehicle body, the mount stiffness of the battery assembly 50, and the mount stiffness of the vehicle seat may be improved.

Referring to FIG. 3, the outer seat rail 14b may be mounted on the center floor panel 2 through a fastener 35 such as a bolt, and a bottom end of the fastener 35 may be fastened to the reinforcing member 20. The outer seat rail 14b and the reinforcing member 20 may be joined to the center floor panel 2 through the fastener 35, and thus the stiffness of the vehicle body and the mount stiffness of the vehicle seat may be improved.

Figure 5:
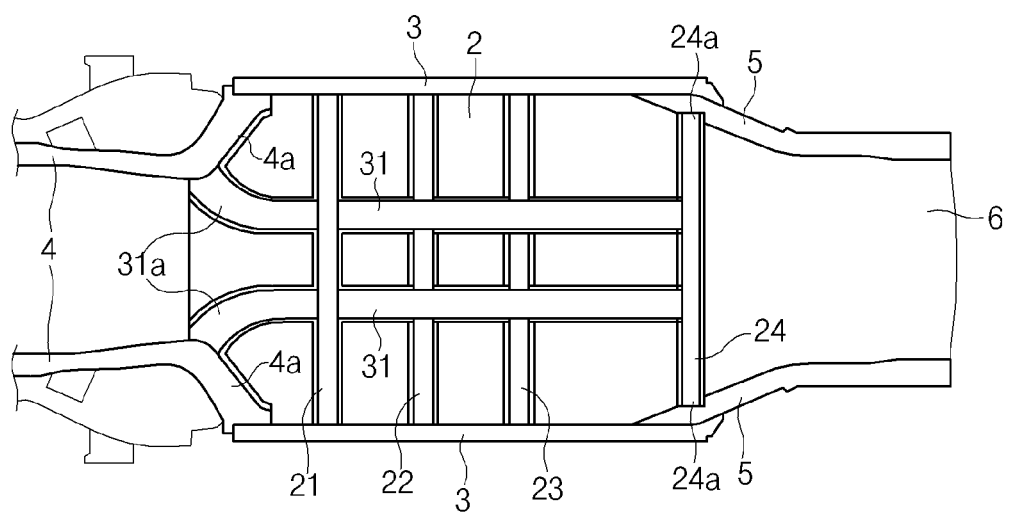
FIG. 5 illustrates a bottom view of a vehicle floor structure according to another exemplary form of the present disclosure.

Referring to FIG. 5, a vehicle floor structure according to another exemplary form of the present disclosure may include a pair of structural members 31 attached to the bottom surface of the center floor panel 2. Each structural member 31 may have a front extension portion 31a extending toward the front side member 4, and the front extension portion 31a may be bent at a predetermined angle. An end of the front extension portion 31a may be directly joined to the front side member 4 by welding and/or the like.

Each structural member 31 may extend along the entire length of the center floor panel 2. In one form, the structural member 31 may extend through the first seat crossmember 21, the second seat crossmember 22, and the third seat crossmember 23, and a rear end of the structural member 31 may be joined to the fourth seat crossmember 24 by welding and/or the like.

Since the other configurations in this exemplary form are the same as or similar to those in the preceding exemplary form, a detailed description thereof will be omitted.

Figure 6:
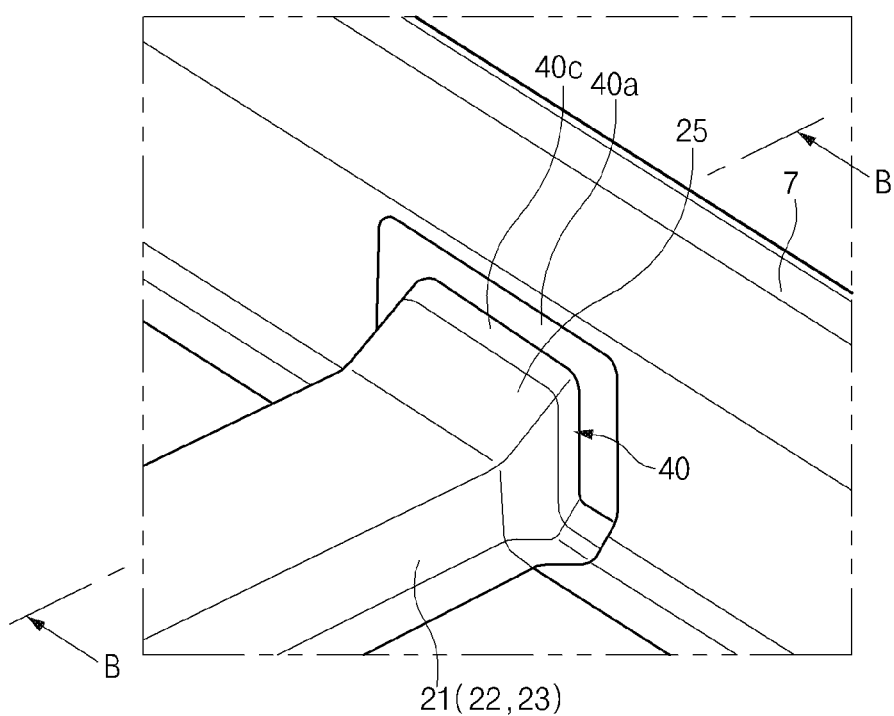
FIG. 6 illustrates the connection of a seat crossmember and a side sill reinforcement in a vehicle floor structure according to another exemplary form of the present disclosure.
Figure 7:
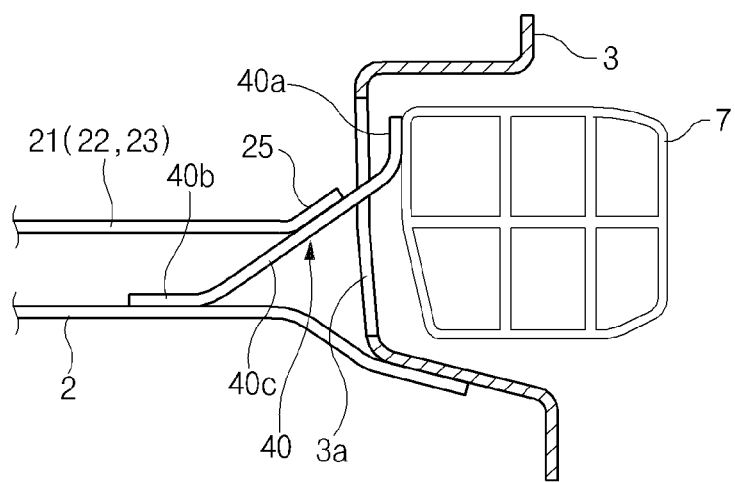
FIG. 7 illustrates a cross-sectional view taken along line B-B of FIG. 6.

Referring to FIGS. 6 and 7, a vehicle floor structure according to another exemplary form of the present disclosure may allow the seat crossmember 21 to be connected to the side sill reinforcement 7 through a reinforcing member 40. The side sill 3 may have an opening 3a through which the reinforcing member 40 passes, and the reinforcing member 40 may pass through the opening 3a. The reinforcing member 40 may have an inclined wall 40c extending obliquely from the center floor panel 2 toward the side sill reinforcement 7 at a predetermined angle. The reinforcing member 40 may have a first flange 40a and a second flange 40b extending along edges of the reinforcing member 40, respectively. The first flange 40a of the reinforcing member 40 may be directly joined to the side sill reinforcement 7 by welding and/or the like, and the second flange 40b of the reinforcing member 40 may be directly joined to the center floor panel 2 by welding and/or the like. Each flange 25 of the first seat crossmember 21, each flange 25 of the second seat crossmember 22, and each flange 25 of the third seat crossmember 23 may be joined to the inclined wall 40c of the reinforcing member 40 by welding and/or the like so that each of the seat crossmembers 21, 22, and 23 may be connected to the side sill reinforcement 7 through the reinforcing member 40. As the ends of each of the seat crossmembers 21, 22, and 23 are connected to the corresponding side sill reinforcements 7 through the reinforcing members 40, the support stiffness of the side sill reinforcements 7 may be improved. For example, when an impact load in a side impact is transferred to the side sill reinforcement 7, the side sill reinforcement 7 may be primarily supported by the reinforcing member 40 and be secondarily supported by the seat crossmembers 21, 22, and 23, and thus rotation or damage of the side sill reinforcement 7 may be prevented.

As set forth above, according to exemplary forms of the present disclosure, the plurality of structural members and the plurality of seat crossmembers may be attached to the bottom surface of the center floor panel 2, thereby improving the stiffness of the center floor panel. In addition, the top surface of the center floor panel may be effectively flattened, and the thickness of the carpet may be unified, and thus cost and weight may be reduced.

According to exemplary forms of the present disclosure, the pair of first structural members may be directly connected to the pair of front side members, and thus the pair of first structural members may stably support a vertical load acting on the front of the center floor panel. In addition, as the first structural members are directly connected to the front side members, a load path may be defined separately from the side sills, and thus the load transferred to the center floor panel through the front side members may be uniformly distributed to the side sills and the first structural members.

According to exemplary forms of the present disclosure, the ends of the seat crossmember may be connected to the corresponding side sills through the reinforcing members, and thus the support stiffness of the side sills may be improved. For example, when an impact load in a side impact is transferred to the side sill, the side sill may be primarily supported by the reinforcing member and be secondarily supported by the seat crossmember, and thus the rotation or damage of the side sill may be prevented.

According to exemplary forms of the present disclosure, the mounting bolt penetrating the battery case and the center floor panel may engage with the inner seat rail, and the battery assembly and the inner seat rail may be joined by the mounting bolt, and thus the stiffness of the vehicle body, the mount stiffness of the battery assembly, and the mount stiffness of the vehicle seat may be improved.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A vehicle floor structure, comprising:
 a center floor panel;
 a side sill mounted on each side of the center floor panel such that a pair of side sills is provided in the vehicle floor structure;
 a plurality of structural members attached to a bottom surface of the center floor panel; and
 a plurality of seat crossmembers attached to the bottom surface of the center floor panel,
 wherein:
 each structural member of the plurality of structural members extends in a longitudinal direction of the center floor panel,
 each seat crossmember of the plurality of seat crossmembers extends in a width direction of the center floor panel, and
 an axis of the plurality of structural members is orthogonal to an axis of the plurality of seat crossmembers,
 each end of at least one seat crossmember among the plurality of seat crossmembers is directly connected to a corresponding side sill among the pair of side sills through a reinforcing member, and
 the reinforcing member includes: a first flange joined to the corresponding side sill, and a second flange joined to the center floor panel.

2. The vehicle floor structure according to claim 1, wherein the reinforcing member has an inclined wall extending obliquely from the center floor panel toward a side sill among the pair of side sills, and
 the at least one seat crossmember among the plurality of seat crossmembers has a flange joined to the inclined wall of the reinforcing member.

3. The vehicle floor structure according to claim 1, wherein the plurality of seat crossmembers includes:
 a first seat crossmember adjacent to a front edge of the center floor panel;
 a second seat crossmember spaced apart from the first seat crossmember toward a rear of the center floor panel;

a third seat crossmember spaced apart from the second seat crossmember toward the rear of the center floor panel; and a fourth seat crossmember spaced apart from the third seat crossmember toward the rear of the center floor panel.

4. The vehicle floor structure according to claim 3, wherein the plurality of structural members includes:

a pair of first structural members located on a front of the center floor panel; and a pair of second structural members located on the rear of the center floor panel.

5. The vehicle floor structure according to claim 4, wherein a front end of each side sill of the pair of side sills is connected to a front side member, and each first structural member of the pair of first structural members has a front extension portion joined to the front side member.

6. The vehicle floor structure according to claim 4, wherein each second structural member of the pair of second structural members connects the third seat crossmember and the fourth seat crossmember.

7. The vehicle floor structure according to claim 1, further comprising: a plurality of seat rails attached to a top surface of the center floor panel, wherein structural members of the plurality of structural members are disposed to face seat rails of the plurality of seat rails.

8. The vehicle floor structure according to claim 7, wherein a battery assembly is mounted under the center floor panel, and a mounting bolt penetrating the battery assembly and the center floor panel engages with a seat rail of the plurality of seat rails.

\* \* \* \* \*